United States Patent [19]

Saxon

[11] 4,144,415
[45] Mar. 13, 1979

[54] KEY TELEPHONE SYSTEM PAGING LOCKOUT CIRCUIT

[75] Inventor: B. Ronald Saxon, Harrisburg, Pa.

[73] Assignee: International Telephone & Telegraph Corp., Nutley, N.J.

[21] Appl. No.: 863,491

[22] Filed: Dec. 22, 1977

[51] Int. Cl.² .................. H04M 1/72; H04M 1/70
[52] U.S. Cl. .................................... 179/99; 179/17 B
[58] Field of Search .................. 179/99, 17 B, 18 AD, 179/18 BF

[56] References Cited

U.S. PATENT DOCUMENTS

| | | | |
|---|---|---|---|
| 3,941,943 | 3/1976 | Matheny | 179/32 |
| 4,013,844 | 3/1977 | Saxon | 179/99 |
| 4,075,434 | 2/1978 | Merritt, Jr. | 179/17 B |
| 4,079,212 | 3/1978 | Sasai | 179/99 |

Primary Examiner—Kathleen H. Claffy
Assistant Examiner—Randall P. Myers
Attorney, Agent, or Firm—John T. O'Halloran; Alfred C. Hill

[57] ABSTRACT

The telephone system includes N line paging lockout printed circuit cards, where N is equal to an integer greater than one. Each of the paging lockout cards includes a first relay controlled circuit to lockout (N-1) of the paging lockout cards from a paging amplifier if any of the (N-1) of the paging lockout cards attempts to initiate a paging operation a fraction of a second after one of the N paging lockout cards has initiated a paging operation. A second relay controlled circuit applies a busy tone to a telephone subset associated with each of the (N-1) of the paging lockout cards attempting to initiate a paging operation after the one of the N paging lockout cards has initiated a paging operation.

15 Claims, 1 Drawing Figure

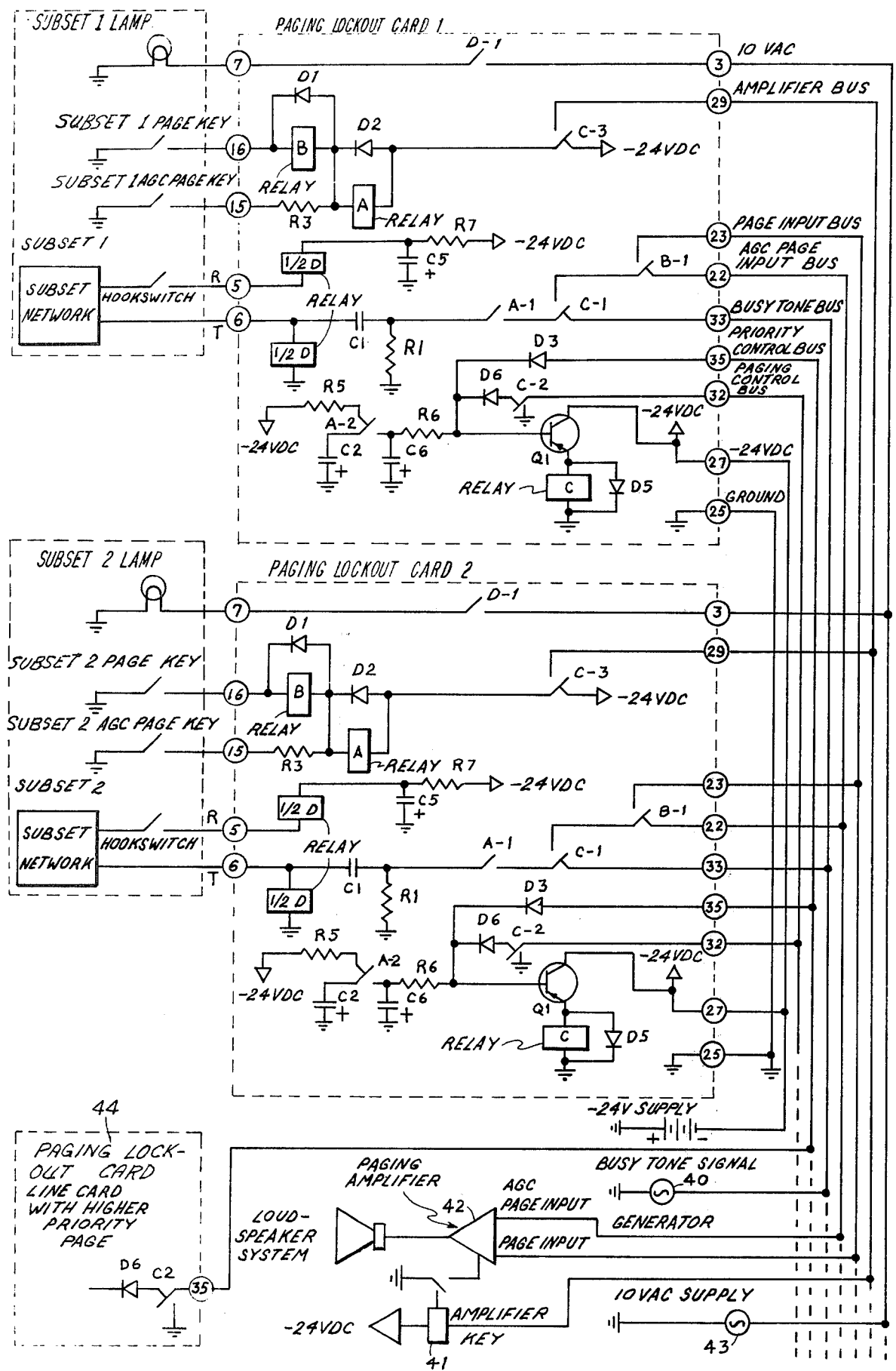

KEY TELEPHONE SYSTEM PAGING LOCKOUT CIRCUIT

BACKGROUND OF THE INVENTION

This invention relates to a key telephone system and more particularly to a lockout circuit for a paging system of such a telephone system.

Prior art intercom cards contain only a single relay for paging circuits. When the key button or switch is depressed, ground is connected to the paging circuit relay thereby causing this relay to activate. A contact of the relay connects voice signals developed in the telephone subset circuit to the input of a paging amplifier. The amplifier input is common to all such paging circuits in multiple card systems. Amplifier activation is accomplished by either a second paging relay contact connecting ground to a common amplifier keying circuit or by arranging the common amplifier keying path as a continuation of each card's paging relay circuit.

One shortcoming of these prior art devices occurs when two cards have their respective paging relays keyed at the same time. This condition connects the subset circuits of both cards to the common paging amplifier input. If the parties using both cards now attempt to make a paging annoucement, the result will be a garbled mixture amplified over the loud speaker system. Since each party is using a different card and there is no method to indicate what one party or the other is about to do, therefore, simultaneous but independent paging is possible.

Another shortcoming of these prior art devices occurs when a key line is shorted to ground due to circuit faults or physical cable damage. This permanently activates the paging relay of the card in question resulting in the "broadcasting" or paging of a conversation often without the knowledge of the parties involved.

SUMMARY OF THE INVENTION

An object of the present invention is to provide a paging system for a key telephone system overcoming the shortcomings of the above-mentioned prior art paging circuits.

Another object of the present invention is to provide a paging circuit for each paging lockout card such that the remaining paging lockout card page circuits are deactivated when one of the paging lockout cards has already initiated a paging operation.

A feature of the present invention is the provision of a key telephone system paging lockout circuit comprising: N paging lockout printed circuit cards, where N is equal to an integer greater than one, each of the cards including a first means to lockout (N-1) of the cards from a common paging amplifier if any of the (N-1) one of the cards attempts to initiate a paging operation a fraction of a second after one of the N cards has initiated a paging operation; and second means coupled to the first means to apply a busy tone to a telephone subset associated with each of the (N-1) of the cards attempting to initiate a paging operation after one of the N cards has initiated a paging operation.

BRIEF DESCRIPTION OF THE DRAWING

Above-mentioned and other features and objects of this invention will become more apparent by reference to the following description taken in conjunction with the accompanying drawing, in which the single FIGURE of the drawing is a schematic partially block diagram of a key telephone system paging lockout circuit in accordance with the principles of the present invention.

DESCRIPTION OF THE PREFERRED EMBODIMENT

The paging lockout circuit of the present invention overcomes the above-mentioned shortcomings of the prior art paging circuits by employing combination lockout and timing circuitry. The lockout circuit will exclude a second paging lockout card paging if it initiated even a fraction of a second after the first paging lockout card's page is in progress. Circuitry is included to connect the output of a busy tone generator to the telephone subset of the excluded or "locked out" parties when they attempt to initiate a page. The busy tone signal is present in the subset as an indication of being locked out of the paging circuit, but only during an attempt to page.

The timing portion of the circuit provides a paging interval of approximately thirty seconds. After this interval if the line card is still keyed, it will be automatically excluded from the paging circuit and a busy tone will be heard in the subset. If the paging key is released, the circuit resets and another thirty second page can be initiated. If the key paging lockout is shorted, than the line card is permanently "locked out" and a continual busy tone will be heard.

Referring to the FIGURE a balanced phone tip/ring circuit is provided by a dual coil relay D. Voice signals developed from the subset tip to ground are coupled to contact A-1 via capacitor C1. Resistor R1 provides a charge/discharge path for capacitor C1. When a subset is connected between the tip and ring conductors (printed circuit card tab 6 and 5), relay D activates.

For AGC paging, tab 15 of the printed circuit paging lockout card is connected to ground via the AGC paging key contact. Current now flows from ground through resistor R3 via tab 15, the coil of relay A and the normally closed contact C-3 to −24VDC. Relay A now activates.

Prior to relay A being activated, the normally closed contact A-2 provides a −24VDC charge to capacitor C2 via resistor R5. When relay A is activated, contact A-2 transfers capacitor C2 from resistor R5 to the discharge path comprising resistor R6, the base-emitter junction of transistor Q1 and the coil of relay C. Transistor Q1 is connected as an emitter follower with the coil of relay C as its emitter load. As such, the impedence of relay C is multiplied by the gain of transistor Q1. Considering the pull-in and drop-out characteristics of relay C, the impedence of the discharge path and the size of capacitor C2, the circuit will operate relay C for a nominal thirty seconds when contact A2 is moved from the position shown to its other position and held in this other position by activation of relay A. If the AGC key is released before thirty seconds, relay C will deactivate. Capacitor C6 provides time delay to eliminate relay C contact chattering.

When relay A is activated contact A-1 connects the subset tip voice signals to the armature of contact C-1. If relay C is not activated, then the normally closed contact C1 connects busy tone to the subset from the busy tone signal generator 40 via tab 33. When relay C activates, then contact C-1 transfers the tip circuit via capacitor C1 from busy tone to the armature of contact B-1. Since relay B is not activated, the normally closed contact B-1 connects the top voice signal to the AGC page amplifier 42 via input tab 22. Meanwhile contact C-3 transfers the key circuit from −24VDC to the amplifier key bus via tab 29. The current flowing in the AGC amplifier key circuit now activates the amplifier key relay 41 located in the associated amplifier/control unit, which consequently activates amplifier 42. Generator 40, relay 41, amplifier 42 and supply 43 are located in a key service unit.

Contact C-2 transfers the page control bus tab 32 from the base of transistor Q1 via isolation diode D6 to ground. Relay C operates as long as the subset's locator button is depressed up to an interval of thirty seconds. During this interval the paging control bus is held at ground potential. If a page is already in progress, the page control bus is at ground potential prior to the activation of paging lockout card relay A (AGC page key activated). Then, when contact A-2 is moved by activation of relay A, capacitor C2 would discharge into a circuit formed by resistor R6 and the base of transistor Q1 shorted to ground over the paging control bus through diode D6. Not only is the discharge time considerably reduced, the available transistor Q1 base drive is only 0.7V which is 1/25th of the drive required to operate relay C.

Consequently, relay C remains inactive, and contact C-1 connects busy tone to the subset's tip circuit via operated contact A-1. Thus, whoever depresses their locator button first, locks the other parties out of the paging circuit and the locked out parties receive a busy tone.

The exception of this involves higher priority pages, which places a ground on the priority bus tab 35. This ground potential shorts out the base of transistor Q-1 via diode D3. The result is the instant shut down of relay C if operated, or to prevent the operation of relay C if it was inactive. The party whose page is either prevented (locked out) or interrupted, will receive a busy tone via contact C-1 as an indication of paging by a priority party as long as their key is depressed.

For non-AGC paging, the page key at tab 16 is connected to ground. The circuit operates as in the AGC paging case, except the current flow is now through relay B instead of resistor R3. Relay B now operates and the voice signals are transferred from the AGC page input at tab 22 to the page input at tab 23. Resistor R3 has the same value as the coil of relay B to equalize keying circuits.

Diodes D1, D2 and D5 suppress inductive voltages generated when relays B, A and C, respectively, are deactivated.

Contact D-1 connects a 10VAC from the 10VAC supply 43 via tab 3 to the subset lamp connected to tab 7.

Resistor R7 and capacitor C5 provide power supply decoupling for the dual coil relay D.

The accompanying FIGURE shows only two identical paging lockout cards in order to simply illustrate the interactions of the page lockout circuits. However, system size is not limited to just two paging lockout cards. Several hundred paging lockout cards can be employed, if necessary.

The C-2 contact of a higher priority card 44 is shown to illustrate two levels of paging priority. Only two levels are included for simplicity. An infinite number of paging priority levels are possible by including isolation diodes similar to diode D3, connected in common to the base of transistor Q1. n-m isolation diodes are required per card where n is the total number of priority levels and m is the priority level of the circuit in question (lowest level = 1, etc.). Each priority level will have a diode D6 - contact C-2 circuit to provide lockout between the paging locking cards of that particular priority level.

While I have described above the principles of my invention in connection with specific apparatus it is to be clearly understood that this description is made only by way of example and not as a limitation to the scope of my invention as set forth in the objects thereof and the accompanying claims.

I claim:

1. A key telephone system paging lockout circuit comprising:
   N paging lockout printed circuit cards each coupled to a common busy tone generator means and an associated one of N telephone subsets, where N is equal to an integer greater than one, each of said cards including
   a first means to lockout (N-1) of said cards from a common paging amplifier if any of said (N-1) of said cards attempts to initiate a paging operation a fraction of a second after one of said N cards has initiated a paging operation, said first means being actuated by at least one page button disposed in said associated one of said N telephone subsets; and
   second means coupled to said first means to apply a busy tone to said telephone subsets associated with each of said (N-1) of said cards attempting to initiate a paging operation after said one of said N cards has initiated a paging operation.

2. A lockout circuit according to claim 1, wherein said first means provides a predetermined time interval for paging.

3. A locking circuit according to claim 2, wherein said predetermined time interval is a nominal thirty seconds.

4. A lockout circuit according to claim 3, wherein said one of said N cards is locked out from said paging amplifier after said nominal thirty seconds has elapsed and said busy tone is applied to one of said telephone subsets associated with said one of said N cards.

5. A lockout circuit according to claim 2, wherein said one of said N cards is locked out from said paging amplifier after said predetermined time interval has elapsed and said busy tone is applied to one of said telephone subsets associated with said one of said N cards.

6. A lockout circuit according to claim 2, wherein each of said first means includes
   first relay means coupled to said page button, and
   second relay means having at least two contacts, one of said two contacts being coupled to said paging amplifier when said second relay means is activated and the other of said two contacts being coupled to ground when said second relay means is activated, said one of said two contacts enabling paging by said one of said N cards and said other of said two contacts coupling ground to said second relay means of all of said (N-1) cards to lockout all of said (N-1) cards from said paging amplifier.

7. A lockout circuit according to claim 6, wherein each of said first means further includes
   a transistor connected as an emitter follower to control said second relay means; and said second relay means includes a first relay coil connected to said transistor as an emitter load;

said second relay means being locked out by ground being coupled to the base of said transistor in all of said (N-1) cards when said first relay coil is activated in said one of said N cards.

8. A lockout circuit according to claim 7, wherein said first relay means includes a second relay coil activated when said page button closes a page switch, said second relay coil having at least one contact to charge a capacitor prior to activation of said second relay coil and to couple said capacitor to the base of said transistor when said second relay coil is activated to activate said first relay coil in said one of said N cards.

9. A lockout circuit according to claim 8, wherein each of said second means includes an additional contact coupled to said first relay means to couple said telephone subsets associated with each of said N cards to said one of said contacts of said second relay means of each of said N cards to enable paging through one of said telephone subsets associated with said one of said N when said second relay means is activated and to receive said busy tone in said telephone subsets associated with each of said (N-1) cards when said second relay means is deactivated.

10. A lockout circuit according to claim 9, further including third means coupled to the base of said transistor to establish a predetermined number of paging priority levels for said N cards.

11. A lockout circuit according to claim 1, wherein each of said first means includes first relay means coupled to said page button, and second relay means having at least two contacts, one of said two contacts being coupled to said paging amplifier when said second relay means is activated and the other of said two contacts being coupled to ground when said second relay means is activated, said one of said two contacts enabling paging by said one of said N cards and said other of said two contacts coupling ground to said second relay means of all of said (N-1) cards to lockout all of said (N-1) cards from said paging amplifier.

12. A lockout circuit according to claim 11, wherein each of said first means includes a transistor connected as an emitter follower to control said second relay means; and said second relay means includes a first relay coil connected to said transistor as an emitter load;

said second relay means being locked out by ground being coupled to the base of said transistor in all of said (N-1) cards when said first relay coil is activated in said one of said N cards.

13. A lockout circuit according to claim 12, wherein said first relay means includes a second relay coil activated when said page button closes a page switch, said second relay coil having at least one contact to charge a capacitor prior to activation of said second relay coil and to couple said capacitor to the base of said transistor when said second relay coil is activated to activate said first relay coil in said one of said N cards.

14. A lockout circuit according to claim 13, wherein each of said second means includes an additional contact coupled to said first relay means to couple said telephone subsets associated with each of said N cards to said one of said contacts of said second relay means of each of said N cards to enable paging through one of said telephone subsets associated with said one of said N cards when said second relay means is activated and to receive said busy tone in said telephone subsets associated with each of said (N-1) cards when said second relay means is deactivated.

15. A lockout circuit according to claim 14, further including third means coupled to the base of said transistor to establish a predetermined number of paging priority levels for said N cards.

* * * * *